United States Patent Office 2,699,365
Patented Jan. 11, 1955

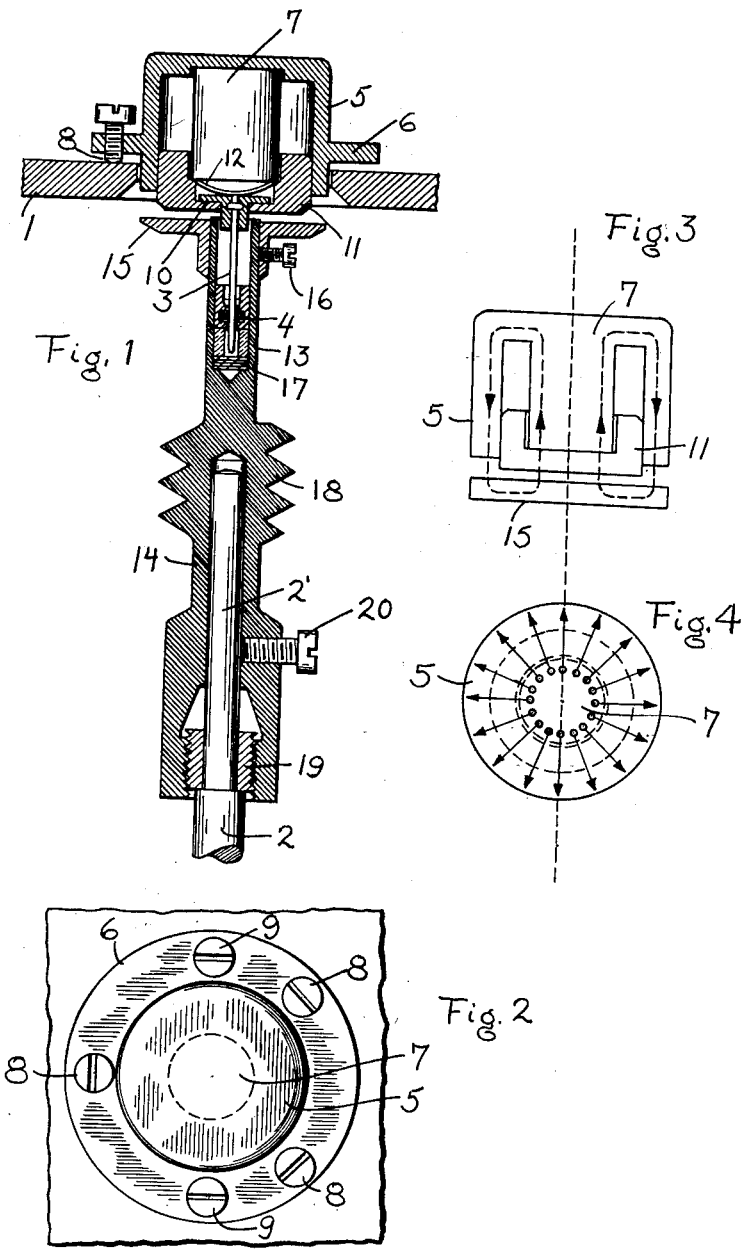

2,699,365

MAGNETIC BEARING FOR ELECTRICITY METERS

Josef Indergand, Heidegasse (Buhl), Baar, Richard Pudelko, Zug, and Werner Bugmann, Zurich, Switzerland, assignors to Landis & Gyr, A. G., Zug, Switzerland, a body corporate of Switzerland Application July 25, 1951, Serial No. 238,462

Claims priority, application Switzerland July 28, 1950

5 Claims. (Cl. 308—10)

The present invention relates to a novel and improved electricity meter having a rotatable member the thrust of which is magnetically relieved.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof illustrate one embodiment of the invention, and together with the description, serve to explain the principles of the invention.

Of the drawings:

Figure 1 is a longitudinal fragmentary section of an embodiment of the present invention;

Figure 2 is a top plan view of the parts shown in Figure 1;

Figure 3 is a diagrammatic view showing the manner in which the magnetic forces act to relieve the thrust; and Figure 4 is a diagrammatic top view of the parts shown in Figure 3.

Magnetic devices for relieving the thrust-bearing of measuring instruments such as electric meters have been known, but in such devices the guiding arrangements of the magnetic flux offer various difficulties and in many cases a magnetic reversal is needed which results in an additional braking action of the rotating system of the instrument. In such known arrangements, constructional difficulties are also met, particularly with regard to the centering of the rotating system and also with regard to the parts effecting the magnetic relief of the thrust.

The present invention has for its object the provision of a novel and improved magnetic thrust relieving device for the rotating element of an electricity meter which is simple and rugged in its construction, applies the magnetic force only in an axial direction and does not impose any added load even on lateral shifting of the rotor. A further object is the provision of a meter bearing a magnetic thrust relieving device which avoids braking of the rotor and which is especially adapted for use with rotors having a guide pin to keep the rotor properly centered.

The present invention provides an improved magnetic thrust relieving arrangement and especially a magnetic relief arrangement on the top-bearing in combination with a needle guide of the measuring instruments, for instance electric meters. In accordance with the present invention the mass of the rotating part of the meter is partially supported by a pot-shaped magnet acting on a magnetically conductive disc having at least about the same diameter as the latter and fixed to the rotor, and these parts are each arranged adjustably relative to each other on the instrument support or the driving system so that the magnitude of the magnetic relief may be varied.

Referring now in detail to the preferred and illustrative embodiment shown in the drawings, the invention is exemplarily applied to a watt hour meter in which there is a meter frame 1, a rotatable member having a shaft 2 in which is mounted a collar bearing 4 guided by a needle 3.

A round permanent magnet 5 having a central cylindrical core 7 with an outwardly extending flange 6 integral with the external pole is adjustably mounted on the upper portion of the frame 1 by means of two draw screws 9 and three compression screws 8 which bear on the upper face of the frame 1 as the cup is seated in a cylindrical hole in the frame member 1.

The round magnet 5 is preferably formed as a cylindrical member having a deep uniform annular groove which separates the central core 7 from the outer portion of the magnet forming the other pole, and if desired, the core member 7 may be separate from the cup portion of the magnet. The magnet members 5 and 7 may be formed of any suitable permanently magnetizable material such as hardened steel or Alnico alloy.

The bearing needle 3 projects downwardly from an insert 10 which is held in an aperture in the spacing member 11 holding the core 77 and cup portion of the magnet 5 in their proper spaced relation. Insert 10 has some freedom of movement within the intermediate piece 11 and is held in place by means of a light compression spring 12, preferably dish shaped, which tends to center the insert 10 and the needle 3.

Insert 10 and the intermediate piece 11 are of non-magnetic material, such as brass.

Collar bearing 4 is located in a bore 13 of the shaft member 14, also of brass or other non-magnetic material, and prevents excessive lateral movement of the shafts 14 and 2. The lower end of the shaft 2 is preferably provided with a conventional jewel or other bearing by which it is supported, and from which the thrust is relieved by the magnetic device.

The magnetic field from the magnet acts on a disc 15 of magnetic material mounted on the upper end of the shaft member 14 and thus the mass of the rotor system is partially lifted and supported by the magnet. The disc 15 is preferably approximately the same diameter as the magnet 5 and, as shown in Figure 3, the magnetic field passes from the outer circular pole of the magnet 5 to the disc 15 and returns to the central core or pole piece 7. The magnet 5 is magnetized so that the central core 7 is of one polarity, while the circular outer portion of the magnet 5 is of opposite polarity.

In the bottom of bore 13 is positioned a disc 17 spaced slightly from the bottom end of the needle 3, which positively limits the upward movement of the shaft.

For minutely regulating the spacing of the disc 15 from the pole pieces of the magnet 5, the shaft 2 is provided with a portion 2' of reduced diameter which may telescope into the drilled lower end of shaft 14, while shaft 2 is also provided with a threaded collar 19 which is engaged with a correspondingly threaded portion of the shaft 14, so that by relative rotation the extension of the shaft 2 may be varied. A set screw 20 secures the shafts 2 and 14 in the desired relative position. The shaft 14 may be formed with a worm portion 18 as is usual in watt hour meters.

The magnet parts of the relief arrangement described consisting of a cup-shaped magnet and a disc having the same or approximately the same diameter produce a magnetic flux the lines of which, as indicated in Figures 3 and 4, leave for example at the pole ring of the pot 5, traverse the air gap between the pot 5 and the disc 15, permeate the disc 15 radially toward the center, traverse again the air gap and passing into the central core 7 of the cup-shaped magnet and close through the upper portion of the cup.

There is thus produced a centering effect on the axle of the system and the rotating disc always remains magnetized in the same direction, so that a magnetic reversal does not take place and any braking action due to the magnet is avoided. This improves accuracy and good operation at small loads, also the magnetic force acts only in an axial direction on the rotating part of the measuring instrument, and no lateral pressures arise in the top bearing, not even when small lateral shifts or asymmetry should momentaneously arise between the cup-shaped magnet and the return disc. Additionally, the parts of the magnet possess a well-closed form, with the result that only a slight magnetic leakage reaches the outside.

The relationship between the various structural parts including insert 10, needle 3 and spring 12, intermediate piece 11, bore member 13 and disc 17 is such that in the case of shock, the surface of the disc 17 engages needle 3 which yields resiliently. If the effect of the shock is not nullified by the resilience of needle 3, then bore member 13 impinges on the intermediate piece 11. In this manner the needle is protected against shock and against injury.

The compression and draw screws 8 and 9 permit a precise parallel adjustment of the cup members relative to the magnetic disc 15, and the latter can be adjusted with regard to the air gap in the magnetic flux field by means of the screw 16 in accordance with the various types of measuring instruments. The screw piece 14 can be adjusted by means of the thread 19 to the axial play between the needle 3 and the disc 17.

The invention in its broader aspects is not limited to the specific mechanisms shown and described but departures may be made therefrom within the scope of the accompanying claims without departing from the principles of the invention and without sacrificing its chief advantages.

What is claimed is:

1. In an electricity meter having a rotatable metering element with a hollow upper end, a needle guide projecting into the hollow end, a cup-shaped permanent magnet having a central pole piece and a spaced cylindrical pole piece supported above the needle guide and rotatable element and a disc of magnetic material having about the same diameter as said cylindrical pole piece, fixed on the upper end of the rotatable element and below and in the magnetic field between the pole pieces of the cup-shaped magnet.

2. An electricity meter as claimed in claim 1 having a frame and means on the outer side thereof for adjustably raising and lowering the cup-shaped magnet to vary the magnetic attraction on the disc.

3. An electricity meter as claimed in claim 1 in which the cup-shaped magnet is adjustably mounted on the outer side of a frame member by draw and compression screws.

4. An electricity meter as claimed in claim 3 in which the needle guide is mounted in an intermediate member supported by a spacer member mounted between the central pole and cup portion of the magnet.

5. An electricity meter as claimed in claim 1 in which the cup-shaped magnet retains an apertured spacer member, the needle guide is mounted on an intermediate member supported in the aperture and a spring resiliently urges the needle guide axially towards the rotatable element.

References Cited in the file of this patent

UNITED STATES PATENTS

| | | |
|---|---|---|
| 730,840 | Pratt | June 9, 1903 |
| 796,067 | Duncan | Aug. 1, 1905 |
| 2,333,647 | Green | Nov. 9, 1943 |

FOREIGN PATENTS

| | | |
|---|---|---|
| 23,991 | Great Britain | May 7, 1904 |
| 322,995 | Great Britain | Dec. 16, 1929 |
| 580,896 | Great Britain | Sept. 24, 1946 |
| 122,508 | Australia | Oct. 31, 1946 |